United States Patent [19]

Perkins

[11] Patent Number: 4,730,181

[45] Date of Patent: Mar. 8, 1988

[54] EARLY WARNING SIGNAL SYSTEM

[76] Inventor: Oscar L. Perkins, R. 1, Box 779, Hereford, Ariz. 85615

[21] Appl. No.: 10,773

[22] Filed: Feb. 4, 1987

[51] Int. Cl.⁴ .............................................. B60Q 1/26
[52] U.S. Cl. ....................................... 340/71; 340/66; 340/87; 340/97; 200/61.89; 180/282
[58] Field of Search ................... 340/71, 52 R, 66, 69, 340/67, 72, 79, 87, 97; 200/61.89; 180/282

[56] References Cited

U.S. PATENT DOCUMENTS 3,428,767  2/1969  Pfeifer ................................... 340/71
3,638,181  1/1972  Bryant ................................... 340/71
4,686,503  8/1987  Miller .................................... 340/71

Primary Examiner—Donnie L. Crosland
Attorney, Agent, or Firm—Norman B. Rainer

[57] ABSTRACT

A deceleration signal system for an automotive vehicle involves components mechanically coupled to the accelerator pedal of the vehicle. When the driver lifts his foot from the accelerator pedal, an amber warning light is directed rearwardly to warn following vehicles. The signal system utilizes electrical circuitry compatible with the vehicle's electrical system, and readily deactivated by the driver during stop-and-go driving conditions.

7 Claims, 3 Drawing Figures

EARLY WARNING SIGNAL SYSTEM

BACKGROUND OF THE INVENTION

This invention concerns apparatus and electrical circuitry to be installed within an automotive vehicle to provide a warning signal light which will alert drivers of following vehicles that said vehicle is decelerating, prior to the ilumination of said vehicle's brake lights, and thereby avoid possible collisions.

Numerous structures are disclosed in the prior art which are operable in various complex manners to alert following drivers of a vehicle's deceleration by factors other than braking. Such instances occur due to slow moving traffic or when said vehicle is about to turn or stop. However, such prior art structures are very complicated in nature, expensive to manufacture, and difficult to install. Such devices usually lack the versatility to function effectively under diverse driving conditions. In fact, such devices could malfunction, causing the accelerator to stick in an open or closed position, and thereby creating a hazard. None encompass means for deactivation of said device while the vehicle is involved in stop-and-go traffic, and none disclose an alarm which will remind the driver to re-activate the device upon acceleration of the vehicle to normal driving conditions. The use of such a device without suitable means for deactivation and reactivation of a signal light is quite annoying to following drivers in stop-and-go traffic and can cause accidents by signaling a false-alarm to following drivers, or not signaling when deceleration occurs.

It is accordingly an object of the present invention to provide a deceleration signal system for an automotive vehicle.

It is another object of this invention to provide a system as in the foregoing object which illuminates a signal light adapted to warn a following driver of the vehicle's deceleration prior to illumination of said vehicle's brake lights.

It is a further object of the present invention to provide a system of the afforesaid nature which may be temporarally deactivated while said vehicle is involved in stop-and-go traffic.

It is yet another object of this invention to provide a system of the afforesaid nature having provision for reminding the driver to reactivate said signal light upon resumption of normal driving conditions.

It is still further object of this invention to provide an early warning signal system of the afforesaid nature which is inexpensive, uncomplicated, and easy to install in a variety of vehicles.

These objects and other objects and advantages of the invention will be apparent from the following description.

SUMMARY OF THE INVENTION

The above and other beneficial objects and advantages are accomplished in accordance with the present invention by a deceleration signal system adapted for cooperative association with an accelerator rod extending between a proximal extremity associated with an accelerator pedal and a distal extremity joined to a carburator linkage, said system comprising 1. switch means comprised of first and second electrical contacts:
    (a) said first contact being fixedly associated with said accelerator rod and having the ability to move therewith in its reciprocal movement as the driver of said vehicle periodically depresses and releases the accelerator pedal which motivates the accelerator rod,
    (b) said second electrical contact being comprised of a bolt having a contact extremity and an adjusting extremity, said bolt being threaded through a rigid, stationary electrically conductive bracket which disposes said bolt in a parallel relationship to said accelerator rod while directing the contact extremity toward said first contact, said bracket being mounted directly to the engine of said vehicle.
2. a third electrical contact comprises of a strip of flat spring steel having an upper extremity disposed within the path of travel of the carburator linkage, and a lower extremity fixedly mounted upon the engine but electrically insulated therefrom, whereby an acceleration of said vehicle will cause the carburator linkage to make electrical ground contact with the upper extremity of said spring,
3. a warning light facing rearward in said vehicle, said light having a negative terminal which is connected to said first electrical contact via an insulated conductive wire, such that an electrical circuit is completed and the light illuminates when the distal extremity of said accelerator rod returns to its forward position by virtue of the driver's lifting of his foot from said accelerator pedal,
4. a buzzer operable on 12 volt direct electrical current and having a negative terminal connected to said third electrical contact via an insulated conductive wire in a manner such that a circuit is completed, and
5. a DPST switch positioned adjacent the driver, said switch controlling a flow of direct current from said vehicle's electrical supply to either said light or said buzzer, depending upon switch position.

In a preferred embodiment of the system, the first contact is associated with the accelerator rod by means of a harness clamp. An electrically insulative sleeve may be disposed upon the accelerator rod in intervening spacing with the harness clamp, thereby preventing completion of the signal light circuit through the accelerator rod.

In another preferred embodiment, the spring steel of the third electrical contact is insulated from the negatively grounded engine of the vehicle by a plastic member. This insulator prevents the buzzer circuit from being completed merely by way of the mounting of the spring to the engine.

In some embodiments, a locknut may be threaded onto said bolt in order to allow for the adjustment of the site at which contact occurs, longitudinally within the path of reciprocal movement of the first contact. Such adjustment determines the amount that the driver may release the accelerator pedal before said warning light illuminates.

The warning light preferably consists of a plastic housing containing a 50 watt quartz halogen lamp mounted in front of a parabolic reflector and behind an amber lens. Said light may be mounted inside or outside said vehicle facing in a rearward direction.

BRIEF DESCRIPTION OF THE DRAWING

For a fuller understanding of the nature of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
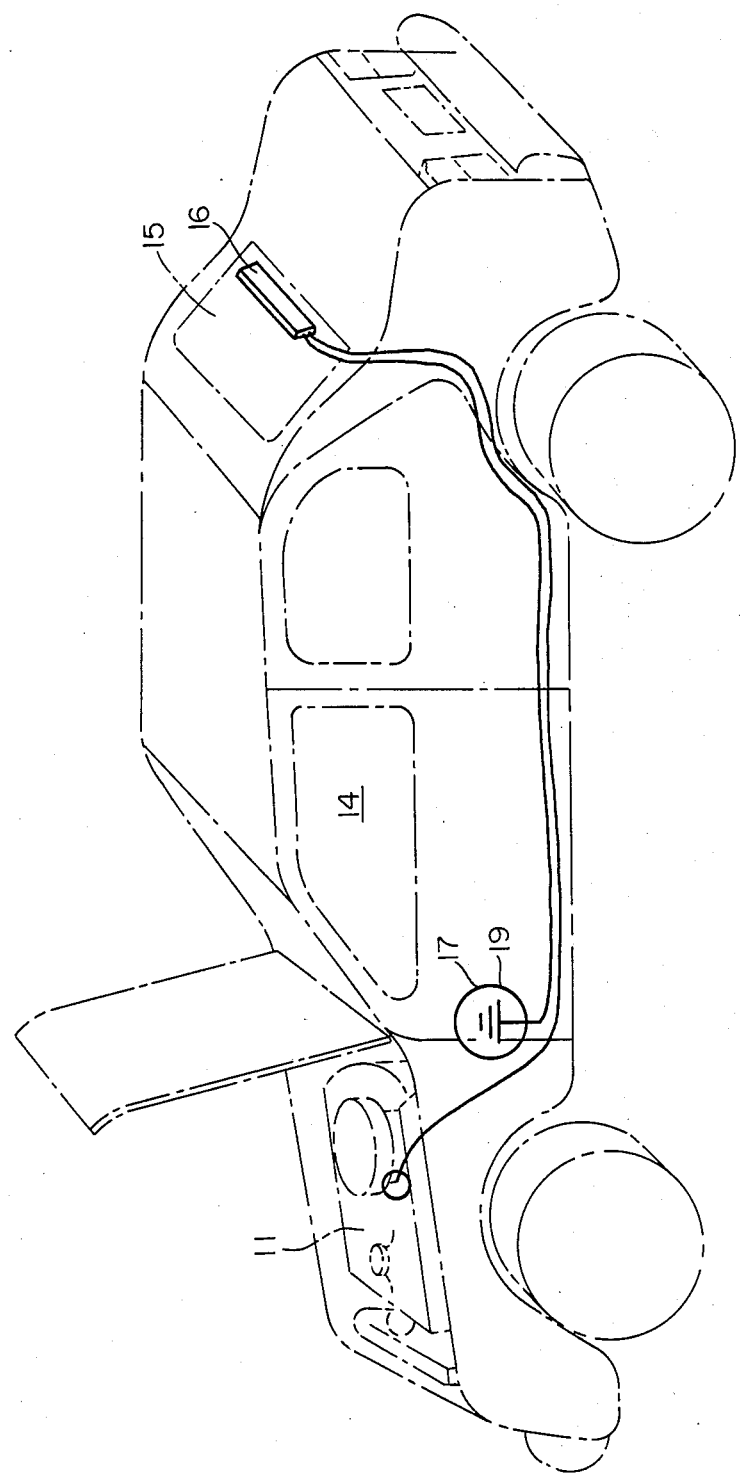
FIG. 1 is a schematic representation of an embodiment of the system of the present invention shown in association with an automotive vehicle of conventional design.
Figure 3:
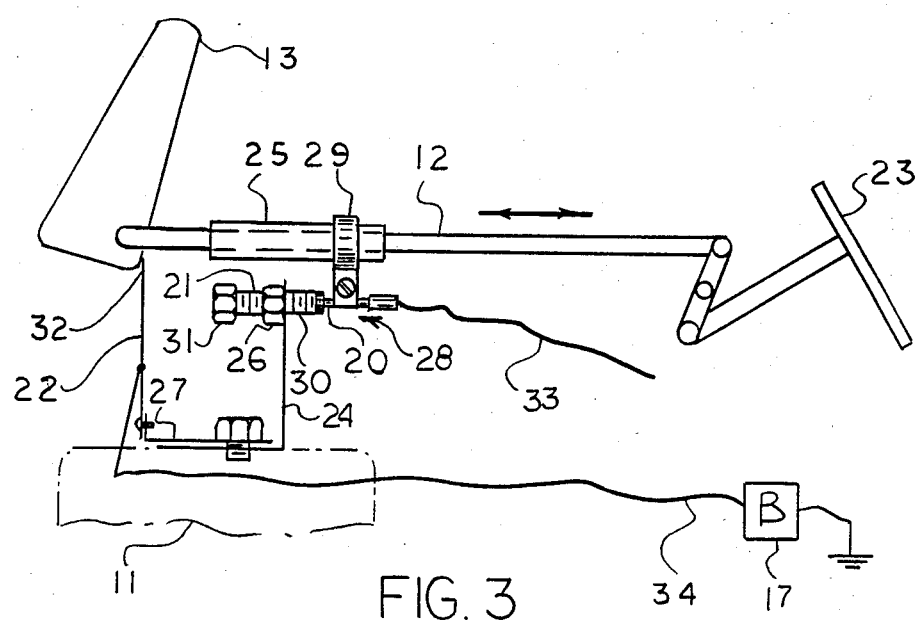
FIG. 3 is a side view of the mechanical components of the invention.
Figure 2:
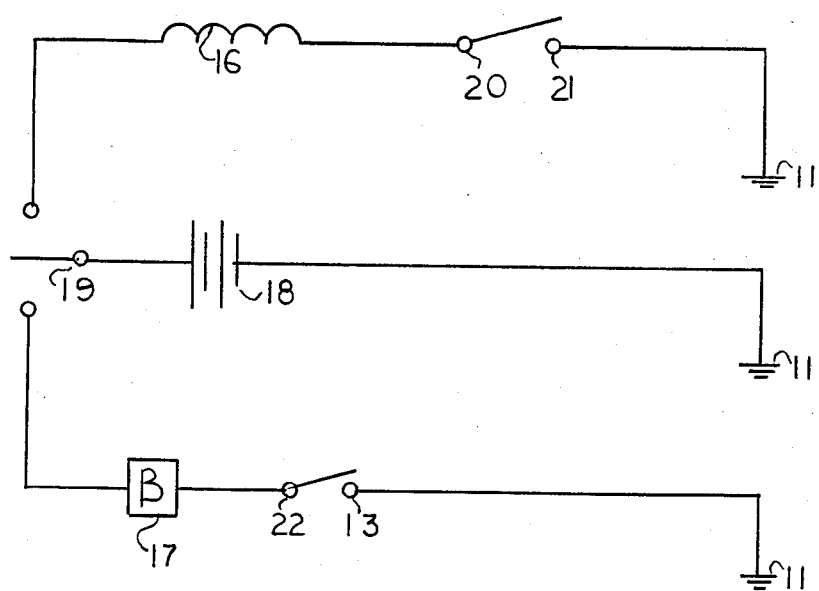
FIG. 2 is an electrical schematic diagram of an embodiment of this invention.

Referring now specifically to the drawing, FIG. 1 illustrates an automotive vehicle equipped with an embodiment of the system of this invention, said vehicle having a passenger compartment 14, rear window 15 and engine block 11. Further components, as shown in FIG. 3, include carburator linkage 13, and accelerator rod 12 having a proximal extremity associated with an accelerator pedal 23 and a distal extremity joined to carburator linkage 13. First contact 20, second contact 21, and third contact 22 are shown relative to the engine block 11, accelerator rod 12, and carburator linkage 13. Upon deceleration of the vehicle, the accelerator rod moves forward, namely to the left, as shown in FIG. 3. The schematic diagram of FIG. 2 shows a circuit encompassing the signal light 16 and a circuit encompassing the buzzer 17, said circuits being energized by the flow of direct current from the vehicle's electrical system 18, and alternately controlled by the DPST switch 19.

Switch means 28 is in the form of an assembly comprising first and second electrical contacts, 20 and 21, respectively. Said first contact 20 is affixed to accelerator rod 12 by means of harness clamp 29 which embraces an intervening insulative sleeve 25 disposed upon said rod. Said sleeve electrically insulates the clamp from the accelerator rod. By virtue of said construction, said first contact has the ability to move in a reciprocal manner with the accelerator rod when the driver of the vehicle depresses and releases accelerator pedal 23. Said second electrical contact 21 is comprised of a bolt having a contact extremity 30 and an adjusting extremity 31, said bolt being threaded through a rigid, stationary electrically conductive bracket 24 which disposes said bolt in a parallel relationship to said accelerator rod and directs the contact extremity toward said first contact 20. The bracket is mounted directly to the engine 11 of the vehicle. The site of contact of said bolt with said first contact is adjusted by means of a locknut 26, which is threaded onto said bolt.

A third electrical contact 22 is comprised of a strip of flat spring steel having an upper extremity 32 disposed within the path of travel of the carburator linkage 13, and a lower extremity fixedly mounted upon the engine 11 but electrically insulated therefrom by insulating bracket 27. An acceleration of said vehicle will cause the carburator linkage 13 to make electrical contact with the upper extremity of spring 22 and thereby complete the buzzer circuit. Warning light 16, facing rearward in said vehicle, has a negative terminal which is connected to said first electrical contact 20 via an insulated conductive wire 33. The light is illuminated when the distal extremity of said accelerator rod 12 returns to its forward position by virtue of the driver's lifting of his foot from the accelerator pedal. Buzzer 17 is mounted adjacent the driver and has a negative terminal which is connected to said third electrical contact 22 via an insulated conductive wire 34. By virtue of such arrangement of components, a circuit is completed and the buzzer sounds when the vehicle is accelerated and the carburator linkage contacts said third electrical contact 22. A DPST switch 19, positioned adjacent the driver, controls a flow of direct current from the vehicle's electrical supply 18 to either said signal light 16 or said buzzer 17, depending upon switch position.

It should be noted that, should the warning system of this invention fail, it will not impair the normal operation of the vehicle. Such fail-safe design is not typical of the prior art warning systems.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A deceleration signal system for an automotive vehicle adapted for cooperative association with an accelerator rod extending between a proximal extremity engaging an accelerator pedal and a distal extremity joined to a carburator linkage, said system comprising
   A. switch means comprised of first and second electrical contacts:
      (1) said first contact being fixedly associated with said accelerator rod and having the ability to move therewith in its reciprocal movement as the driver of said vehicle periodically depresses and releases the accelerator pedal which motivates the accelerator rod,
      (2) said second electrical contact being comprised of a bolt having a contact extremity and an adjusting extremity, said bolt being threaded through a rigid, stationary electrically conductive bracket having a straight arm which disposes said bolt in a parallel relationship to said accelerator rod while directing the contact extremity toward said first contact, said bracket being mounted directly to the engine of said vehicle,
   B. a third electrical contact comprised of a strip of flat spring steel having an upper extremity disposed within the path of travel of the carburator linkage, and a lower extremity mounted upon the engine but electrically insulated therefrom, whereby an acceleration of said vehicle causes the carburator linkage to make electrical ground contact with the upper extremity of said spring,
   C. a warning light facing rearward in said vehicle, said light having a negative terminal which is connected to said first electrical contact via an insulated conductive wire, such that an electrical circuit is completed and the light illuminates when the distal extremity of said accelerator rod returns to its forward position by virtue of the driver's lifting of his foot from said accelerator pedal,
   D. a buzzer operable on 12 volt direct electrical current and having a negative terminal connected to said third electrical contact via an insulated conductive wire in a manner such that a circuit is completed, and
   E. a DPST switch positioned adjacent the driver, said switch controlling a flow of direct current from said vehicle's electrical supply to either said light or said buzzer, depending upon switch position.

2. The signal system of claim 1 wherein said first contact is attached to the acceleration rod by means of a harness clamp.

3. The signal system of claim 2 wherein an electrically insulative sleeve is fixedly disposed upon the acceleration rod, and said harness clamp fixedly embraces said sleeve.

4. The signal system of claim 1 wherein the lower extremity of said third electrical contact is mounted upon the engine using a bracket fabricated of an electrically insulative plastic.

5. The signal system of claim 1 wherein said spring steel contact is straight and disposed in parallel relationship to the straight arm of said electrically conductive bracket.

6. The signal system of claim 1 wherein a locknut is threaded onto said bolt to adjust the location of the site at which it touches said first contact.

7. The signal system of claim 1 wherein said warning light is a 50 watt quartz halogen lamp mounted in front of a parabolic reflector within a plastic housing having a rearward facing amber lens.

* * * * *